(12) United States Patent
Schneider et al.

(10) Patent No.: US 6,616,387 B2
(45) Date of Patent: Sep. 9, 2003

(54) METAL CUTTING TOOL WITH DIRECT CUTTING PLATE ARRANGEMENT

(75) Inventors: Thomas Schneider, Hirrlingen (DE); Siegfried Bohnet, Mossingen (DE); Klaus Enderle, Freiburg (DE)

(73) Assignee: Walter AG, Tubingen (DE)

( * ) Notice: Subject to any disclaimer, the term of this patent is extended or adjusted under 35 U.S.C. 154(b) by 0 days.

(21) Appl. No.: 09/941,191

(22) Filed: Aug. 28, 2001

(65) Prior Publication Data

US 2002/0085887 A1 Jul. 4, 2002

(30) Foreign Application Priority Data

Sep. 1, 2000 (DE) .......................... 100 43 016

(51) Int. Cl.[7] .............................. B23B 51/02
(52) U.S. Cl. .................. 408/211; 407/40; 407/53; 407/61; 408/224; 408/713
(58) Field of Search ................. 407/30, 33, 35, 407/40, 41, 43, 47, 48, 50, 53, 54, 42, 61, 34; 408/223, 224, 227, 713, 211

(56) References Cited

U.S. PATENT DOCUMENTS

| | | | | |
|---|---|---|---|---|
| 3,963,365 A | * | 6/1976 | Shallenberger, Jr. | 408/186 |
| 4,132,493 A | * | 1/1979 | Hosoi | 407/42 |
| 4,265,574 A | * | 5/1981 | Eckle | 407/61 |
| 4,367,991 A | * | 1/1983 | Grafe et al. | 408/186 |
| 4,564,321 A | * | 1/1986 | Kondo et al. | 407/36 |
| 4,687,387 A | * | 8/1987 | Roos | 407/54 |
| 4,733,995 A | * | 3/1988 | Aebi | 407/34 |
| 4,889,456 A | * | 12/1989 | Killinger | 408/224 |
| 5,049,011 A | * | 9/1991 | Bohnet et al. | 408/199 |

FOREIGN PATENT DOCUMENTS

| | | |
|---|---|---|
| DE | 3417 168 A1 | 11/1984 |
| DE | 43 25 999 A1 | 2/1995 |
| DE | 196 09 820 A1 | 9/1996 |
| EP | 0 257 372 A1 | 8/1987 |
| EP | 0 537 476 B1 | 9/1992 |
| GB | 2 079 656 A | 1/1982 |

* cited by examiner

Primary Examiner—Daniel W. Howell
(74) Attorney, Agent, or Firm—Leydig, Voit & Mayer, Ltd.

(57) ABSTRACT

An improved slot-drilling cutter has a tool body with plate seats at the end, which are arranged symmetrically in respect to each other. Cutting plates are arranged on the seats, whose cutting edges, as well as possibly cutting edges 41, 42, are set identically, i.e. which cover each other completely in the circumferential direction. Because of this, respectively two cutting edges are active for the drilling operation, as well as for the milling operation, which increases the metal cutting yield and allows the same advancement when drilling, as well as when milling. The slot-drilling cutter is free of lateral forces because of the symmetrical design, which permits a high degree of working precision in spite of large advancement moves.

17 Claims, 9 Drawing Sheets

METAL CUTTING TOOL WITH DIRECT CUTTING PLATE ARRANGEMENT

FIELD OF THE INVENTION

The invention relates to a slot-drilling cutter having cutting plates adapted for high metal cutting capacity.

BACKGROUND OF THE INVENTION

Metal cutting tools are used for cutting while a rotating tool is axially advanced. In this process, the cutting edges of the metal cutting tool are in constant engagement with the material of the workpiece and perform an essentially uninterrupted cut. Because of this, the cutting stress on the cutting edges at the end of the tool is steady, i.e. not vibrating or pulsating. However, it is often also desirable that the metal cutting tool be laterally advanced for milling cutting. Peripheral cutting edges are required for this. Since the peripheral cutting edges in this case are not in steady, but rather in intermittent, contact with the workpiece cutting is interrupted, and vibrating or pulsating forces are accordingly created, which act on the peripheral cutting edges. The tool suitable for such work must be able to withstand such forces.

A machining tool is known from EP 0 257 372, which is made completely of a hard alloy and has been molded in an extruding process. It is designed to be dynamically balanced in respect to its axis of rotation and has two end cutting edges and two peripheral cutting edges. When a cutting edge is worn, the cutting tool as a whole must be replaced or refitted.

A slot-drilling cutter is known from DE 34 17 168 A1, whose tool body is equipped with cutting plates at the tool body end, as well as on the circumference. One of the two cutting plates which are active at the tool body end is arranged as a lateral plate. The cutting edge of this cutting plate extends radially outward, starting at the center of rotation, but not over the entire radius. The end cutting edge of the other complementary cutting plate arranged at the tool end extends from an outer corner area radially inward, but not as far as the lateral plate. Thus there are areas of the radius in which only one cutting edge is active. This applies in particular to the exterior area of the slot-drilling cutter. The axial advancement of the slot-drilling cutter is therefore limited by the metal cutting yield of this one cutting edge. The tool body of this known slot-drilling cutter moreover has plate seats for peripheral cutting plates. These are arranged in two rows, which are offset in respect to each other and are spaced apart. Here, the cutting edges of the peripheral cutting plates in the two rows overlap each other in such a way that areas exist, in which two cutting edges are active, wherein in the gaps between two peripheral cutting plates of a row only a cutting edge section of a cutting plate of the other row is active. Because of this, the advancement speed for lateral advancement movements is limited by the metal cutting yield of this cutting edge area.

Another slot-drilling cutter is known from DE 196 09 820. Its tool body has several chip grooves with plate seats. These are arranged in such a way that the cutting plates of the individual rows assume different axial positions and therefore overlap at the peripheral cutting edges. At the corners, i.e. in the transition area from the peripheral cutting edges to the end cutting edges, two round plates have been inserted. These are arranged in different axial and radial positions, so that one of them is active with its peripheral cutting edge, while the other is active with its end cutting edge. Thus, the round plates limit the metal cutting yield for the drilling movement (axial advancement), as well as for the milling movement (radial advancement).

Limited metal cutting yields result with the drilling tools, or drilling-milling tools, in accordance with the prior art mentioned above. If, however, the tools are not equipped with cutting plates, but are made completely from a hard alloy, maintenance of worn cutting edges is impossible, or at least expensive.

A milling head is furthermore known from EP 0 537 476 B1, which is also equipped for drilling. The milling head has an elongated slim tool body, at whose end two round plates are arranged as cutting plates. In this case these cutting plates are maintained in appropriate seats in such a way that their cutting edges touch each other at the axis of rotation, or that the cutting plates overlap, i.e. partially touch each other at the metal cutting faces. Thus, the metal cutting faces (front ends) of the cutting plates are located on a common plane. In order to obtain a sufficient clearance angle, the cutting plates must have significant conical shape, in particular with drilling-milling tools of small diameter. This weakens the cutting edges.

OBJECTS AND SUMMARY OF THE INVENTION

Based on the foregoing, it is an object of the invention to provide a slot-drilling cutter which is versatile in use, produces a large metal cutting yield, permits a precise metal cutting of the workpiece, and which is simple to maintain.

A slot-drilling cutter in accordance with the invention is equipped with cutting plates, which are releasably secured on a tool body. Suitable clamping means, such as clamping claws, clamping screws, fastening screws or the like must be used for fastening. It is particularly advantageous if the cutting plates have a central fastening opening, through which a fastening screw is to extend. The latter presses the cutting plate against the plate seat and, if required, against an appropriate lateral contact.

A special feature of the slot-drilling cutter in accordance with the invention is that the tool body has two plate seats at its end, which are arranged symmetrically in respect to the axis of rotation and are provided for cutting plates which-are substantially identical. The cutting plates respectively have at least an end cutting edge, which is oriented substantially radially with respect to the axis of rotation, a peripheral cutting edge, which is oriented substantially along the longitudinal axis of the tool, and a corner cutting edge, which constitutes a transition between the end cutting edge and the peripheral cutting edge. The end cutting edges of the two cutting plates are not offset against each other in the radial direction, instead they are arranged in the same axial position. The inclinations of the end cutting edges furthermore are similar. Because of this, a fixed point on one end cutting edge defines the same pitch circle as the corresponding point on the other end cutting edge fixed at the same radius. In other words, both end cutting edges lie in a common plane. The end cutting edges are essentially straight, i.e. they can be slightly curved, as long as the radius of curvature exceeds half the plate diameter. The end cutting edge also can be divided into several sections, which together enclose an obtuse angle. The end cutting edge furthermore can have one or several steps.

The cutting plates are arranged in such a way that their front ends, i.e. the surface whose normal surface line points in the circumferential direction, are offset in respect to each other. Thus, the front ends of the cutting plates are respectively contained on different planes which are parallel with each other and do not extend through the axis of rotation. In regard to the rotatory movement of the metal cutting tool, the respective plane in which the front end of the respective cutting plate is located, leads a radial plane with which it is parallel and which extends through the axis of rotation. The lead of the peripheral cutting edges in this way results a clearance angle without the respective cutting plates having to have a special conicity. Thus, the cutting plates can have a right angle, or an only slightly more acute angle, constituting the lip angle at their peripheral cutting edges. This assures the stability of the cutting edge and in particular enables a high metal cutting yield.

Furthermore, this arrangement permits the support of the cutting plates toward the inside against a narrow, and therefore rigid strip, or the direct contact of the lateral faces of the cutting plates against each other. This type of support permits the transmission of radial forces occurring in the course of milling. The mentioned offset of the top surfaces of the cutting edges against each other therefore provides the basis for an improved lateral support of the cutting plates. The improved support of the cutting edges in turn can be used for increased metal cutting yield.

Finally, the same applies to the corner cutting edges and the peripheral cutting edges. Because of this, respectively two cutting edges are active during drilling operations (axial advancement), as well as during milling operations (radial advancement). The metal cutting yield is therefore doubled in comparison with a tool with only one cutting plate, and the same advancement speeds can be employed for drilling, as well as milling. This considerably simplifies machine programming, because the danger of overloading the tool because of inadvertent excessive advancement speeds, or because of unacceptably long treatment times for safety reasons, can be prevented.

The cutting plates are arranged on the tool body offset by 180° in relation to the axis of rotation, and therefore symmetrically in respect to the axis of rotation. Because of this, the forces generated by the two cutting plates during drilling operations essentially cancel each other out so that no significant radial forces are created. This allows a high degree of precision during the treatment operations, in particular during drilling.

In principle, the end cutting edges, corner cutting edges and peripheral cutting edges of the two cutting plates can have lengths differing from each other. In that case, if care is taken, cutting edge sections which do not have an assured complete overlap of the two cutting plates, either are not used for metal cutting, or are assisted by other cutting plates. But it is preferred to embody end cutting edges, corner cutting edges and peripheral cutting edges each with the same length and in the same shape. In this way the cutting plates arranged on the end of the tool body can be identical, which lowers the outlay for maintenance and production.

The end cutting edges and the peripheral cutting edges are designed to be essentially straight. But the corner cutting edge, depending on the requirements, may be curved in an arc to a greater or lesser extent. Starting at the corner cutting edge, both end cutting edges extend inward at the same length toward the center of rotation surrounding the axis of rotation. The center of rotation not covered by the cutting edges forms an area which is not treated by milling during drilling, in which a small peg can initially remain on the workpiece. This is milled off or broken off as a whole during the subsequent lateral movement of the drilling tool (milling).

The end cutting edges are preferably inwardly inclined, i.e. their end near the axis of rotation is offset in the direction of the shaft of the tool body in respect to the corner cutting edge. In other words, the sections of the end cutting edges adjoining the corner cutting edge project axially the most. In this way, the working of level surfaces during lateral advance (milling) is made possible, and the drilling tool can be employed simultaneously as slot cutter (slot-drilling cutter). Thus, the two end cutting edges define a truncated cone which constitutes an angle of taper of preferably greater than 170°. But the peripheral cutting edges are preferably arranged on a cylinder surface. If the peripheral cutting edges are oriented parallel with the axis of rotation, the peripheral cutting edges can be designed to be completely straight. But if the cutting plates are installed at an angle to the axis in the tool body, or if an axial milling angle is provided on the cutting plates (possibly because the cutting plates are designed to be wedge-shaped), the peripheral cutting edges are curved in such a way that they lie on the generated surface of an imagined cylinder. If required, the cutting edges can be helical, in the shape of an elliptical arc, or follow any other curve located on the imagined generated surface of the cylinder.

On its side facing the axis of rotation, the end cutting edge preferably makes a transition into a section which is inclined in respect to the remaining end cutting edge and which herein is called an inner cutting edge. The end cutting edges are respectively arranged in front of a radius which is parallel with them. This provides a high cutting plate stability of the cutting plates in the area of the peripheral cutting edges possible. In that case the inner cutting edges then lead behind this radial line in the vicinity of the axis of rotation (area of the center of rotation), which also makes metal cutting work possible there. Possibly remaining pegs are therefore slim and do not hamper the drilling advancement.

For absorbing the radial contact forces occurring in the course of milling, the two cutting plates of the metal cutting tool can be in contact with a strip area of the tool body which contains the axis of rotation and is embodied as a wedge, for example, and tapers narrowly toward the front end of the tool body. This makes it possible to bring the end cutting edges directly up to the axis of rotation and to minimize to a very small area the center of rotation not covered by the metal cutting process. If necessary, the plate seats can also be designed to be open toward the inside, i.e. the cutting plates will not find a radial lateral contact face at the plate seats. In this case it is possible that the cutting plates meet at the axis of rotation and together define a narrow gap, or are pressed against each other. In this case the inner cutting edges, i.e. the sections of the end cutting edges extending into the center of rotation, are preferably inclined toward the plate seat so that these cutting edge sections do not run in front of, but behind, the center of rotation. In this way cutting edge sections are prevented from being moved opposite their orientation.

It is possible to provide more than two cutting plates on the end of the tool body. Here, too, it is possible to let the cutting plates contact directly in order to form a gap-free cutting edge. This increases the metal cutting yield and makes simple plate seats possible.

A longitudinal step can be used for supporting the cutting plates in the lateral direction (radially), a transverse step can be provided in the axial direction. In addition, a dowel screw can be provided, which provides the support in one direction. The metal cutting tool is preferably a slot-drilling cutter which can be used for drilling, as well as milling. An axial entry into the workpiece is possible because of the complete outfitting of the end of the drilling tool with cutting plates.

Other objects and advantages of the invention will become apparent upon reading the following detailed description and upon reference to the drawings, in which:

Figure 1:
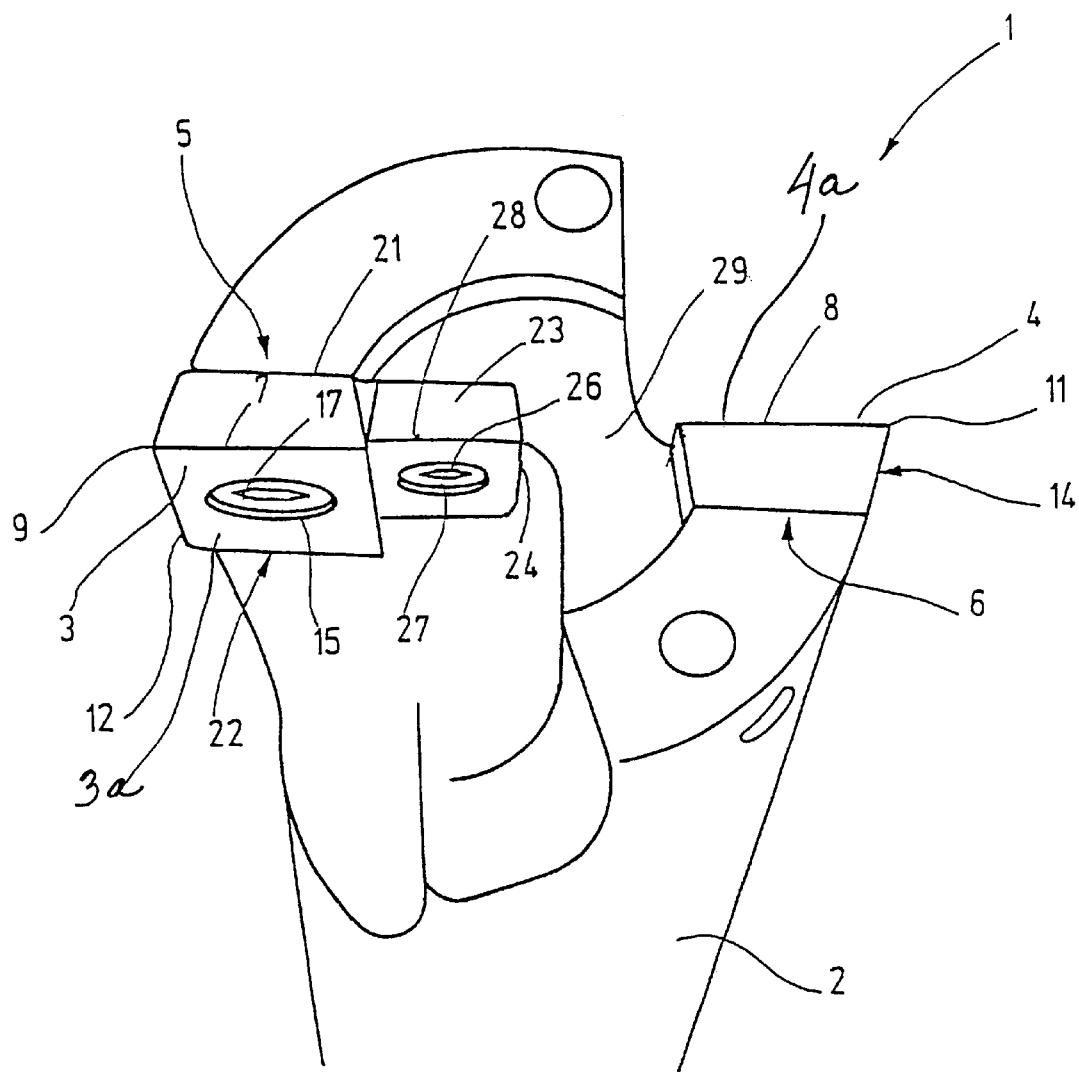
FIG. 1 is a fragmentary perspective of a slot-drilling cutter in accordance with the invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of-the invention.

DETAILED DESCRIPTION OF THE PREFERRED EMBODIMENTS

Figure 2:
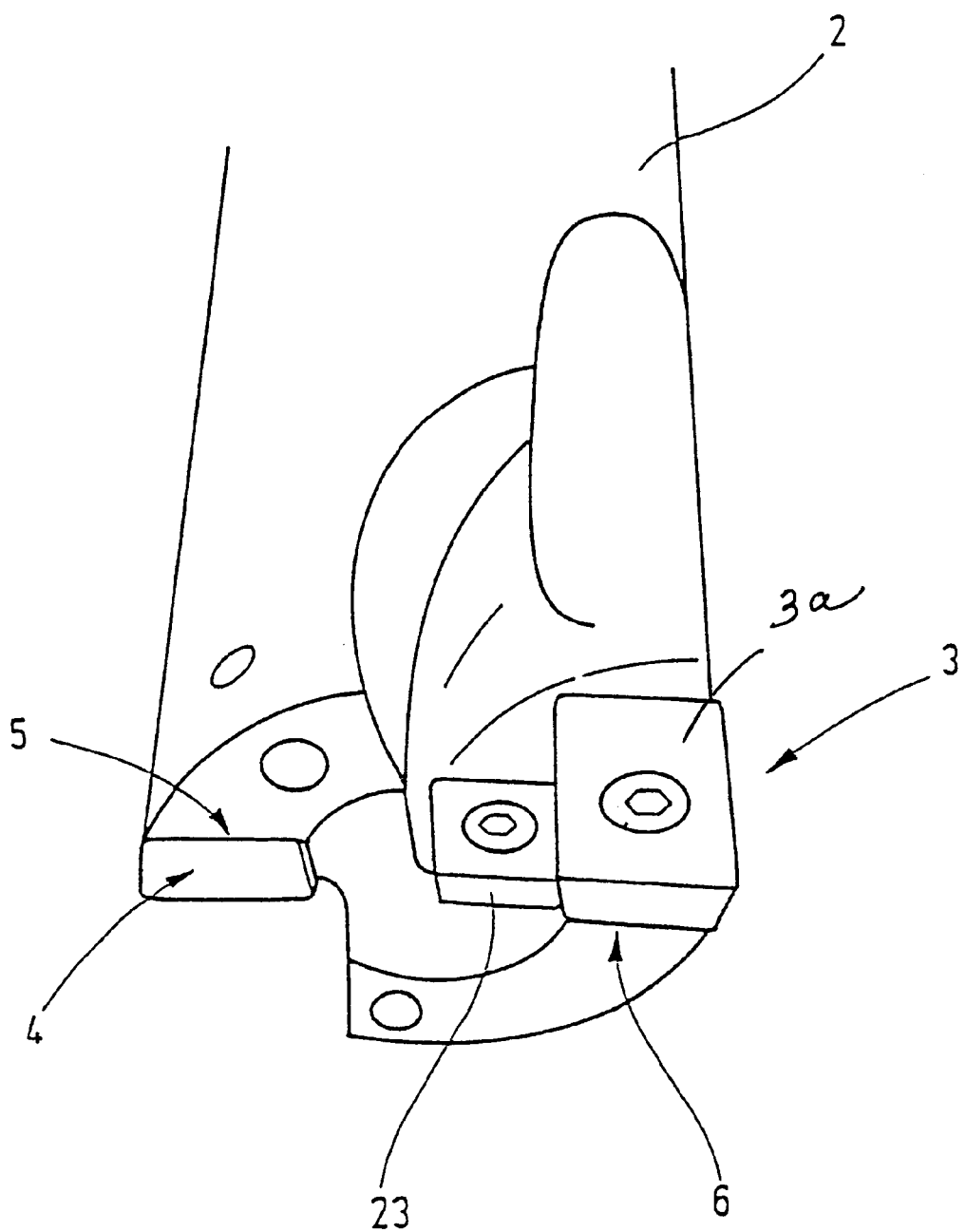
FIG. 2 is another perspective of the slot-drilling cutter shown in FIG. 1.
Figure 3:
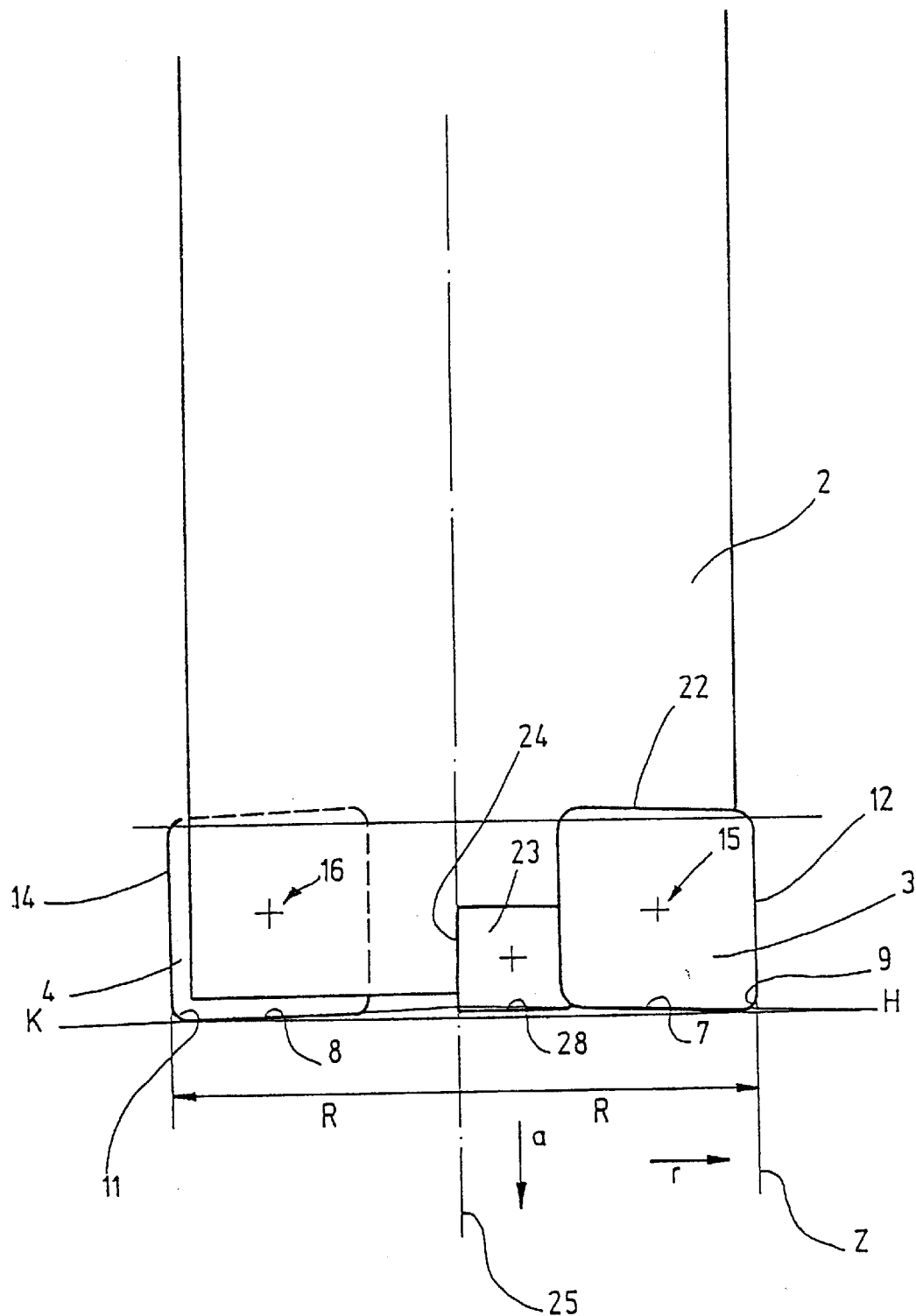
FIG. 3 is side view of the illustrated slot-drilling cutter.

Referring now more particularly to FIGS. 1–3 of the drawings, there is shown an illustrative slot-drilling cutter 1 embodying the present invention. The illustrated slot-drilling cutter 1 includes a tool body 2 and two cutting plates 3, 4 at the corners, which are arranged in appropriate plate seats 5, 6 of the tool body 2. The cutting plates 3, 4 are designed as reversible cutting plates and respectively have an end cutting edge 7, 8, a corner cutting edge 9, 11, and a peripheral cutting edge 12, 14. The cutting plates 3, 4 are rectangular plates with a central fastening opening 15, 16, which is symbolized in FIG. 3 only by its respective center, and which terminates at a top or end surface 3a, 4a of the cutting plate. A fastening screw 17 is seated in the fastening opening 15, 16, which presses the cutting plate 3, 4 against the contact surface of the plate seat 5, 6, which in the illustrated embodiment is flat.

The cutting plates 3, 4 are designed identical to each other. If necessary, they can be exchanged. But the plate seats 5 and 6 are designed slightly differently. As illustrated in FIGS. 1 and 2, the plate seat 5 of the cutting plate 3 is defined by a flat resting surface 21, whose normal surface line points in the circumferential direction and through which a threaded bore for the fastening screw 17 passes, and also by an axial contact face 22. The cutting plate 3 is supported in the radially inward direction by a further cutting plate 23, which in turn is radially in contact with a lateral contact face 24. The latter lies on, or close to, the axis of rotation 25 defined by the tool body 2, about which the slot-drilling cutter 1 rotates during its operation.

The cutting plate 23 is a rectangular plate with a central fastening opening 26, in which a fastening screw is seated. The cutting plate 23 is designed as a reversible cutting plate and, as illustrated in FIG. 3, its end cutting edge 28 extends from the axis of rotation 25 to the inner lateral side face (free face) of the cutting plate 3. Thus, the end cutting edge 28 extends behind the cutting edge 7 of the outer cutting plate 3. A first complete cutting edge is formed by this and extends from the axis of rotation 25 to the corner cutting edge 9. The number of cutting edges in the area of the end cutting edge 7 is z=2. The cutting edge 7, along with the cutting edge 8, is located on a common flat cone, whose apex lies on the axis of rotation 25. The cone angle of this cone is almost 180°. The tip of the cone points upwardly, as viewed in FIG. 3, i.e. the corner cutting edges 9, 11 extend farther away from the tool body 2 than sections of the cutting edges 7, 8 close to the axis of rotation, which are positioned the same in the radial direction, as well as in the axial direction.

This also applies to the corner cutting edges 9, 11, which define the same rotational shape and are located at the same height H. The height H fixes the axial position.

The peripheral cutting edges 12, 14 also are identically positioned, they lie on the generating surface of an imagined cylinder Z and each are adjusted at the same radius R in respect to the axis of rotation 25. Therefore the slot-drilling cutter 1 has two complete cutting edges at its periphery (peripheral cutting edges 12, 14), as well as at its corner cutting edges (corner cutting edges 7, 8), as well as at its end (end cutting edges 7, 8). Thus the number of teeth z in the area of the cutting plates 3, 4 located at the corners is z=2 throughout.

The slot-drilling cutter 1 so far described operates as follows:

To treat a workpiece by metal cutting, the slot-drilling cutter 1 is chucked on a work spindle of a treatment machine and fixed against relative rotation. The slot-drilling cutter 1 is rotated at a suitable number of revolutions about the axis of rotation 25 by the work spindle. In addition, an advancing movement is imparted to the slot-drilling cutter 1 and/or the workpiece, which can be directed parallel with or at right angles to the axis of rotation 25. A superimposed advancing movement can also be performed, wherein the resulting relative movement between the workpiece and the slot-drilling cutter 1 has a component in the direction of the axis of rotation 25, as well as a component transversely to it.

If the advancing movement has only one component in the direction of the axis of rotation 25, the slot-drilling cutter 1 performs a drilling operation. In the process, the end cutting edges 7, 8 and the corner cutting edges 9, 11 come into engagement with the workpiece and respectively cut chips of the same thickness. The resulting reaction forces acting on the cutting plates 3, 4 are oppositely directed and add up to a torque. No lateral forces, which would deflect the tool body 2 laterally, result from this. Only the comparatively smaller cutting plate 23 arranged in the vicinity of the axis of rotation 25, which marks the center of rotation of the metal cutting tool 2 by means of its corner facing the axis of rotation 25, is arranged asymmetrically in respect to the axis of rotation 25 and therefore can generate a non-compensated laterally acting force. The cutting edge 28 is shorter than the cutting edge 7 or 8, so that this force is relatively small. Because of the metal cutting volume, which is reduced in the center of rotation, a single cutting plate can be sufficient in this area during normal advancement.

If it is intended to perform a further metal cutting operation on the workpiece laterally with respect to the hole cut in the course of the drilling operation, the advancing movement is provided a component which is directed laterally with respect to the axis of rotation, or the advancing movement is a transverse movement altogether. Now the peripheral cutting edges 12, 14 are respectively alternatingly active (during drilling, the end cutting edges 7, 8 were simultaneously active). By means of this, the drive torque is respectively concentrated on one of the two cutting plates 3, 4. However, in spite of this, both peripheral cutting edges 12, 14 are counted for calculating the advancing speed so that it is possible to operate at the same advancing speed as during drilling. The pulsing forces, which alternatingly act on the peripheral cutting edges 12, 14, are absorbed by the tool body 2. In the process, the elasticity of the latter results in a certain resilient deformation or displacement of the respective plate seat 5, 6. Thus, the two cutting plates 3, 4 can move in respect to each other within the limits of the elasticity of the tool body. Different from drill inserts made from a hard alloy, which are continuous, i.e. pass through the axis of rotation 25, it is therefore possible to obtain a dependable operation even under heavy conditions, independently of a possibly existing increased brittleness of the hard cutting plate material. This applies even though the tool body is considerably weakened in two areas at its end, i.e. the plate seats 5, 6, by the plate seats, and only a narrow strip 29 connects the flutes of the tool body 2, which are respectively formed behind the plate seats 5, 6. The reversible cutting plates are preferably made of a hard alloy (tungsten carbide with a slight amount of cobalt and, if desired, a suitable coating, for example of $Al_2O_3$)

Figure 4:
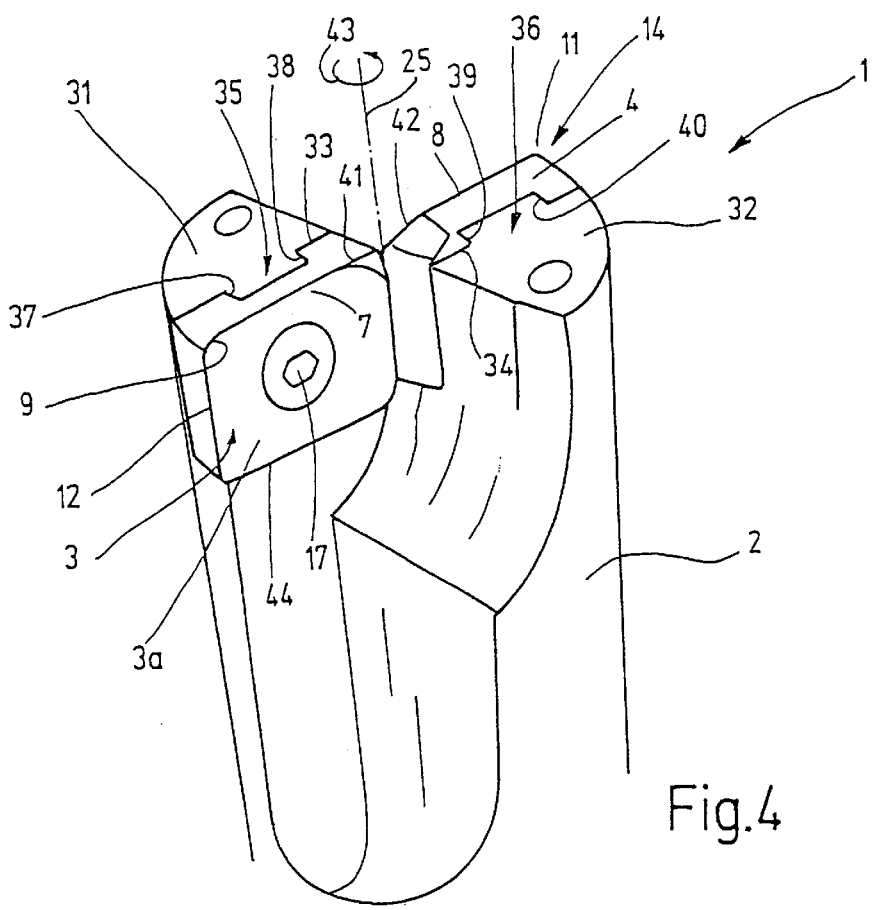
FIG. 4 is a fragmentary perspective of an alternative embodiment of the slot-drilling cutter in accordance with the invention.
Figure 5:
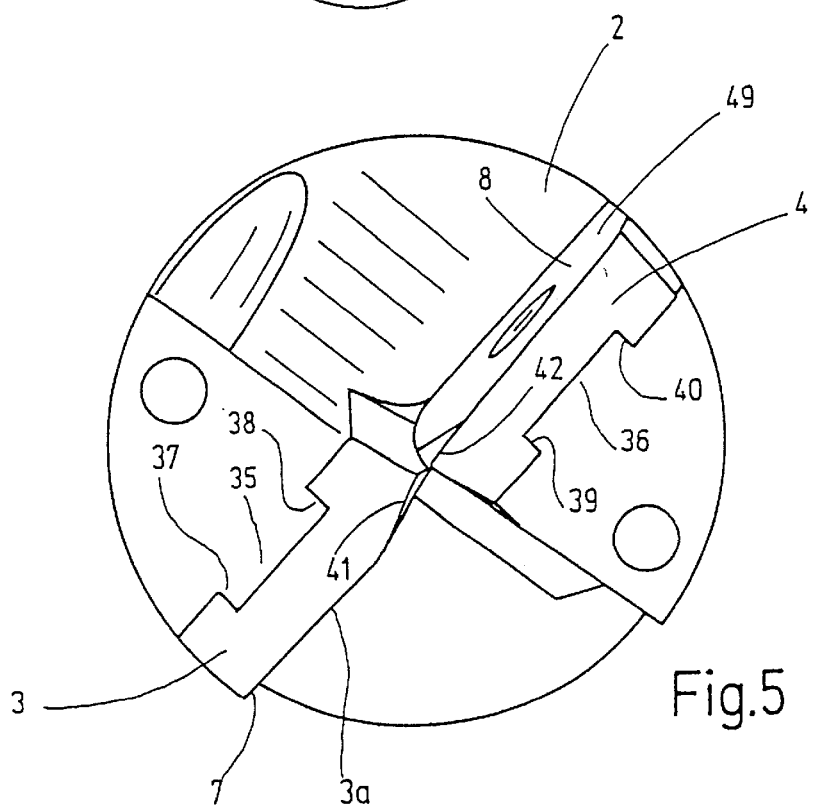
FIG. 5 is another perspective of the end of the slot-drilling cutter shown in FIG. 4.
Figure 6:
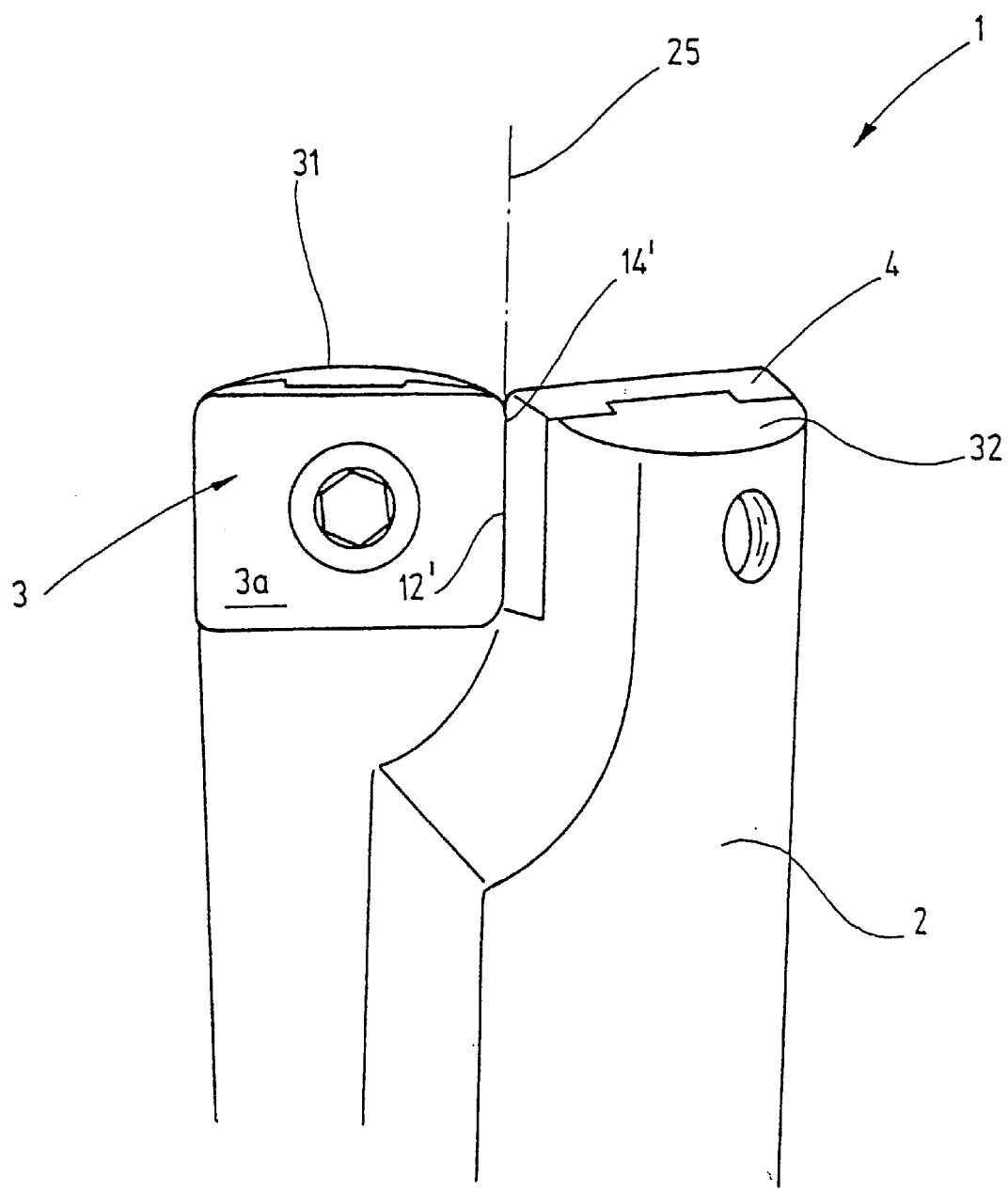
FIG. 6 is another perspective of the slot-drilling cutter shown in FIGS. 4 and 5.

An alternative embodiment of the invention is illustrated in FIGS. 4, 5 and 6. The metal cutting tool 1 represented in these figures is identical in some essential characteristics to the above described metal cutting tool in accordance with FIGS. 1 to 3, and to this extent reference is made, based on identical reference symbols, to the above description.

However, different from the previously described metal cutting tool 1, it has two cutting plates 3, 4, which meet at the axis of rotation 25. To this end, two flutes 31, 32 have been formed in the tool body 2, which extend parallel with the axis of rotation and are spaced apart from each other in the manner of free-standing pinnacles or fingers. They measure approximately 90° in the circumferential direction. Each flute 31, 32 constitutes a plate seat, whose contact face 33, 34 has a center, strip-like projection 35, 36. The latter protrudes from the otherwise flat contact face 33, 34. The projections 35, 36 respectively have two flanks 37, 38, 39, 40, which are oriented parallel with the axis of rotation and fix the radial orientation and positioning of the cutting plates 3, 4.

Threaded openings pass through the projections 35, 36, in which the respective fastening screws 17 are seated. As in the previous exemplary embodiment, the cutting plates 3, 4 are identically positioned, i.e. the peripheral cutting edges 12, 14, the rounded or straight corner cutting edges 9, 11 and the end cutting edges 7, 8 are identical, but are each offset in respect to the axis of rotation 25, preferably by 180°, from each other in the circumferential direction, therefore the number of cutting edges z=2.

Starting at the corner cutting edges 9, 11, the end cutting edges 7, 8 extend in a direction toward the center area of rotation surrounding the axis of rotation 25. In the area of the center of rotation the end cutting edges 7, 8 make a transition into inner cutting edges 41, 42, as can particularly be seen in FIG. 5. The inner cutting edges 41, 42 are more greatly inclined inwardly than the end cutting edges 7, 8 and are arranged in such a way that they run behind the axis of rotation 25 in relation to the intended direction of rotation of the slot-drilling cutter 1 (see the arrow 43 indicating the direction of rotation in FIG. 4). Therefore the number of cutting edges is z2, also in the center area of rotation. A small peg remaining between the cutting edges 41, 42, which is initially not cut during the drilling metal cutting of a workpiece, is pushed away laterally by the cutting plates 3, 4 during the drilling movement because of the axial advancement, without hampering the axial advancement. Thus, the maximum diameter of the center area of rotation is limited by the maximum permissible diameter of the peg.

Axial contact faces 44, 45 formed on the appropriate plate seats provide axial support for the cutting plates 3, 4 in the tool body 2. As illustrated in particular in FIG. 6, the cutting plates 3, 4 touch each other in the center area at the axis of rotation 25. The cutting edges at the inside which, when the cutting plates 3, 4 are designed as reversible cutting plates, correspond to the peripheral cutting edges 12, 14 and are identified by 12', 14' in FIG. 6, and respectively rest against the free faces of the adjoining cutting plate 3, 4. Because of this line- or strip-shaped resting engagement of the cutting plates 3, 4 against each other, which also can be seen in FIG. 5, a lateral pressure transmission from one cutting plate 3, 4 to the respectively other cutting plate 4, 3 takes place during the milling treatment, so that the lateral stability need not be exclusively provided by the flutes 31, 32. However, the line- or strip-shaped resting engagement of the cutting plates 3, 4 against each other permits a microscopic movement, in particular a microscopic pivoting movement, of the cutting plates 3, 4 against each other, which assures the high load carrying capability of the slot-drilling cutter 1, in particular during milling operations.

Alternatively, a narrow gap can be maintained between the cutting plates 3, 4, so that the cutting plates 3, 4 do not touch each other. Then the support of the cutting plates 3, 4 takes place exclusively by means of the flutes 31, 32, which can be advantageous in connection with light metal cutting operations.

Figure 7:
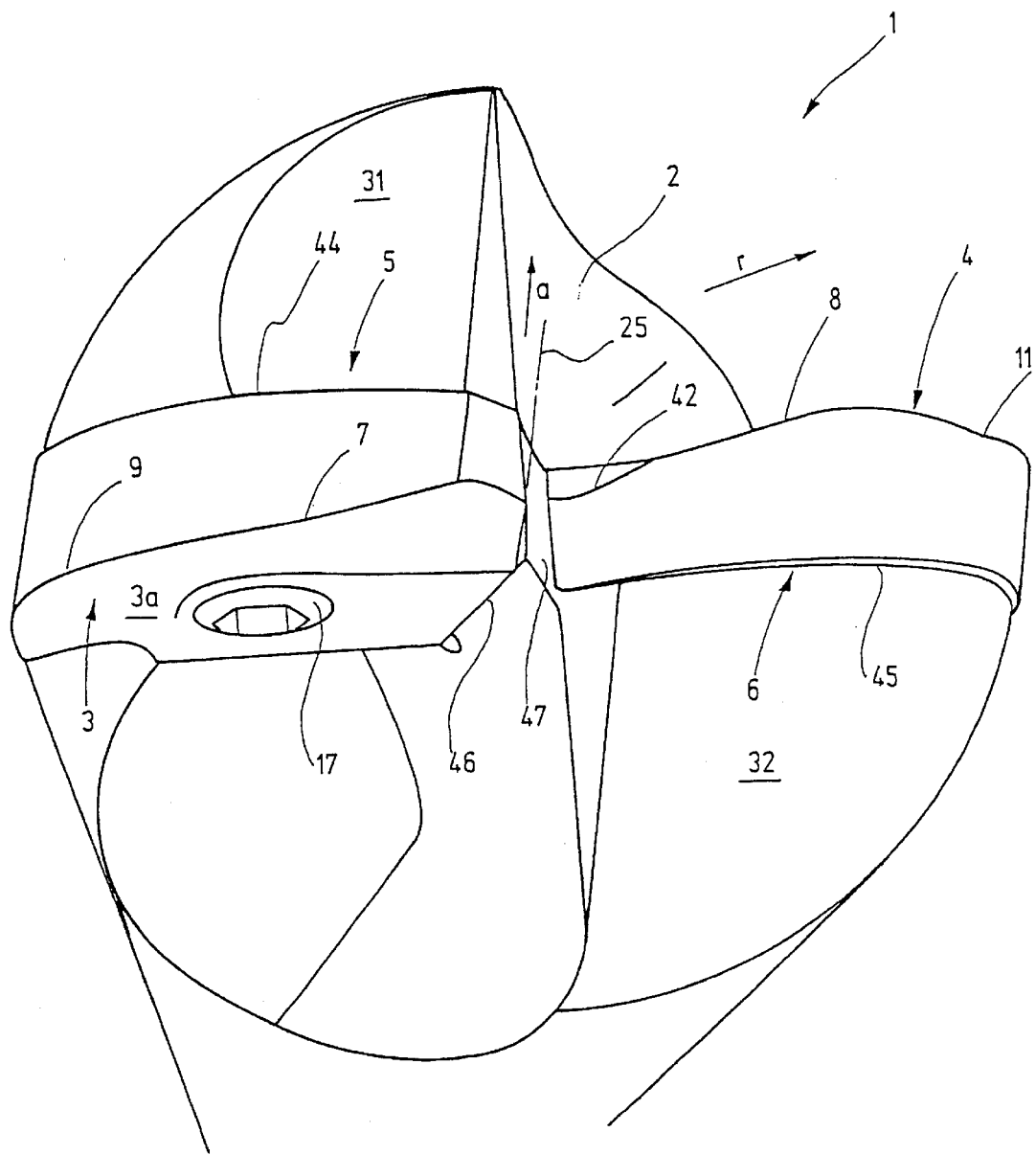
FIG. 7 is fragmentary perspective of an end of still another embodiment of slot-drilling cutter in accordance with the invention.

A further exemplary embodiment of cutting tool according to the invention is illustrated in FIG. 7. This embodiment differs from the previously described embodiments by the design of the plate seats 5, 6 in the tool body 2. Respective level surfaces 44, 45, which are used as resting surfaces and whose normal surface lines are approximately oriented in the circumferential direction, are part of the plate seats 5, 6. An inner contact face 46, 47 adjoins the level surfaces 44, 45 radially on the inside, i.e. at the axis of rotation 25. The inner contact faces 46, 47 are arranged at an acute angle with respect to each other and in this way define a wedge, which is arranged on the tool body 2 symmetrically with respect to the axis of rotation 25, and tapers toward the tool end and at the end connects the two flutes 31, 32 of the tool body with each other. Thus, the wedge constitutes a strip corresponding to the strip 29 in FIG. 1, but with a pointed end located on the axis of rotation 25. The cutting plates 3, 4 are identical with each other and each have a lateral side contact face resting radially against one of the faces 46, 47. The fastening screws 17 are used for pressing the cutting plates 3, 4 against their resting-surface 44, 45 and against the inner contact faces 46, 47. For supporting the cutting plates 3, 4 in the axial direction, appropriate contact faces also can be provided so that the plate seat has a total of three contact faces. The tool body 2, as well as the plate seats 5, 6, are symmetrical with respect to the axis of rotation 25. As shown in FIG. 7, the cutting plates 3, 4 can have corner cutting edges 9, 11, that are rounded over a large radius, or alternatively can have corner cutting edges 9, 11 which are rounded over a small radius, such as shown in FIG. 1. The end cutting edges 7, 8 extend as far as the vicinity of the center of rotation marked by the inner cutting edge sections 41, 42. These inner cutting edge sections 41, 42 extend up to the axis of rotation 25, or intersect behind it.

This slot-drilling cutter 1 has two cutting edges or two sets of teeth over the entire length of its cutting edges and therefore permits a high metal cutting yield in the axial advancing direction a, as well as in the radial advancing direction r. The same advancing speeds can be used in both directions a, r. Because of the symmetrical design of the tool body 2 and the symmetrical arrangement of the identical cutting plates 3, 4, the tool is free of radial forces during drilling operations. During milling operations each cutting plate 3, 4 can transfer the forces acting on it via its own plate seat 5, 6 to the tool body 2 without introducing forces into the other cutting plate 4, 3.

Figure 8:
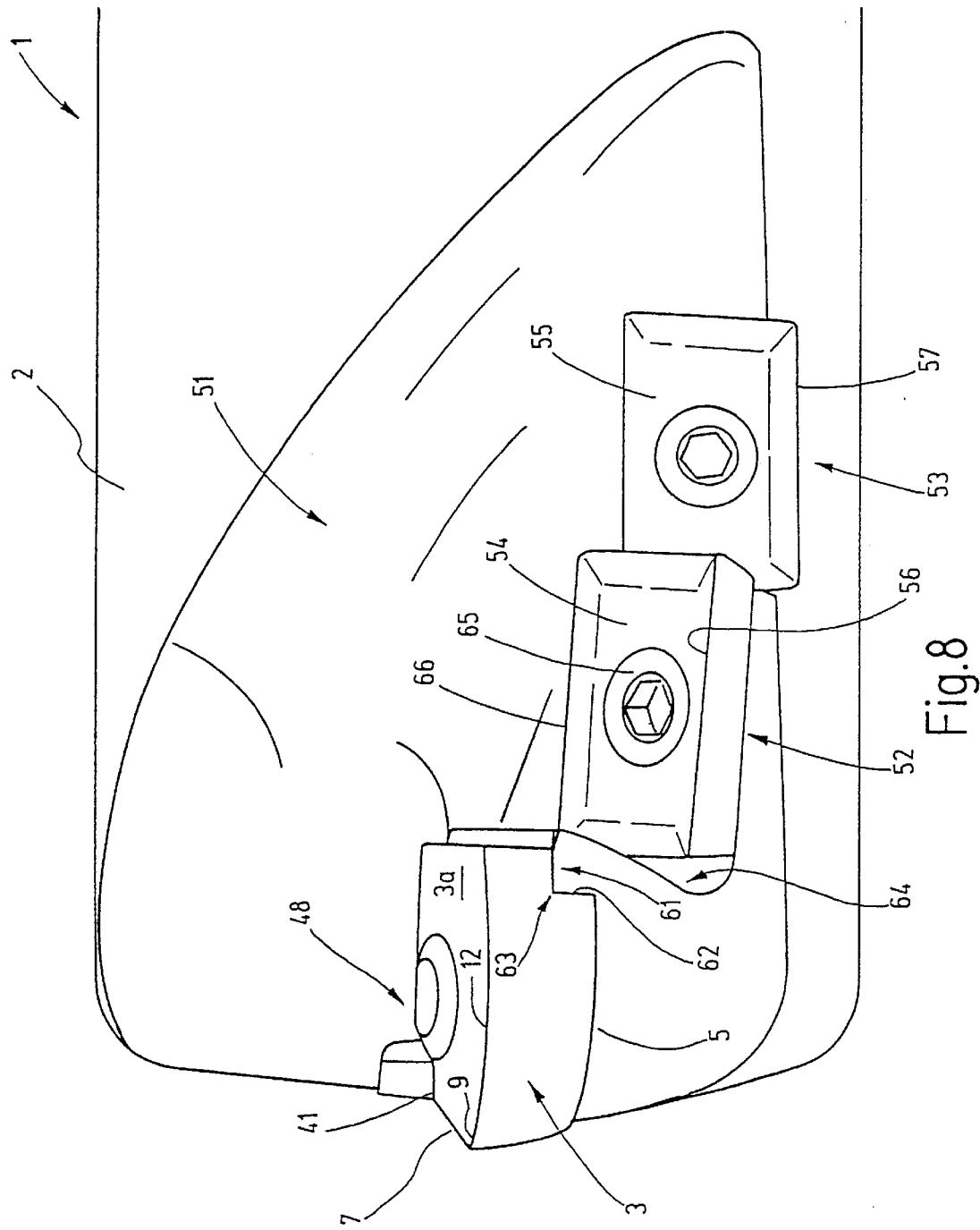
FIG. 8 is a fragmentary perspective of the end of another embodiment of slot-drilling cutter in accordance with the invention.

A further exemplary embodiment of the slot-drilling cutter 1 is illustrated in FIG. 8. The tool body 2 has two plate seats 5, 6 (FIG. 10) at its end for the cutting plates 3, 4. As can be seen in FIG. 7, a narrow strip 48, on which lateral inner contact faces 46, 47 are formed, is formed between the plate seats 5, 6. The arrangement of the cutting edges 7, 9, 12, 41, as well as the cutting edges of the cutting plate 4, are the same as those described in connection with the embodiment of FIG. 7.

However, while the slot-drilling cutter 1 in accordance with FIG. 7 has only two cutting plates 3, 4, the cutting tool in accordance with FIG. 8 is intended as a slot-drilling cutter for deeper grooves. Further bearing seats 52, 53, on which further cutting plates 54, 55 are placed, are arranged adjoining the bearing seat 5 in a chip space 51. The cutting plates 54, 55 are reversible cutting plates of preferably rectangular, rhomboid or parallelogram-shaped basic form. Square plates can also be used.

Figure 9:
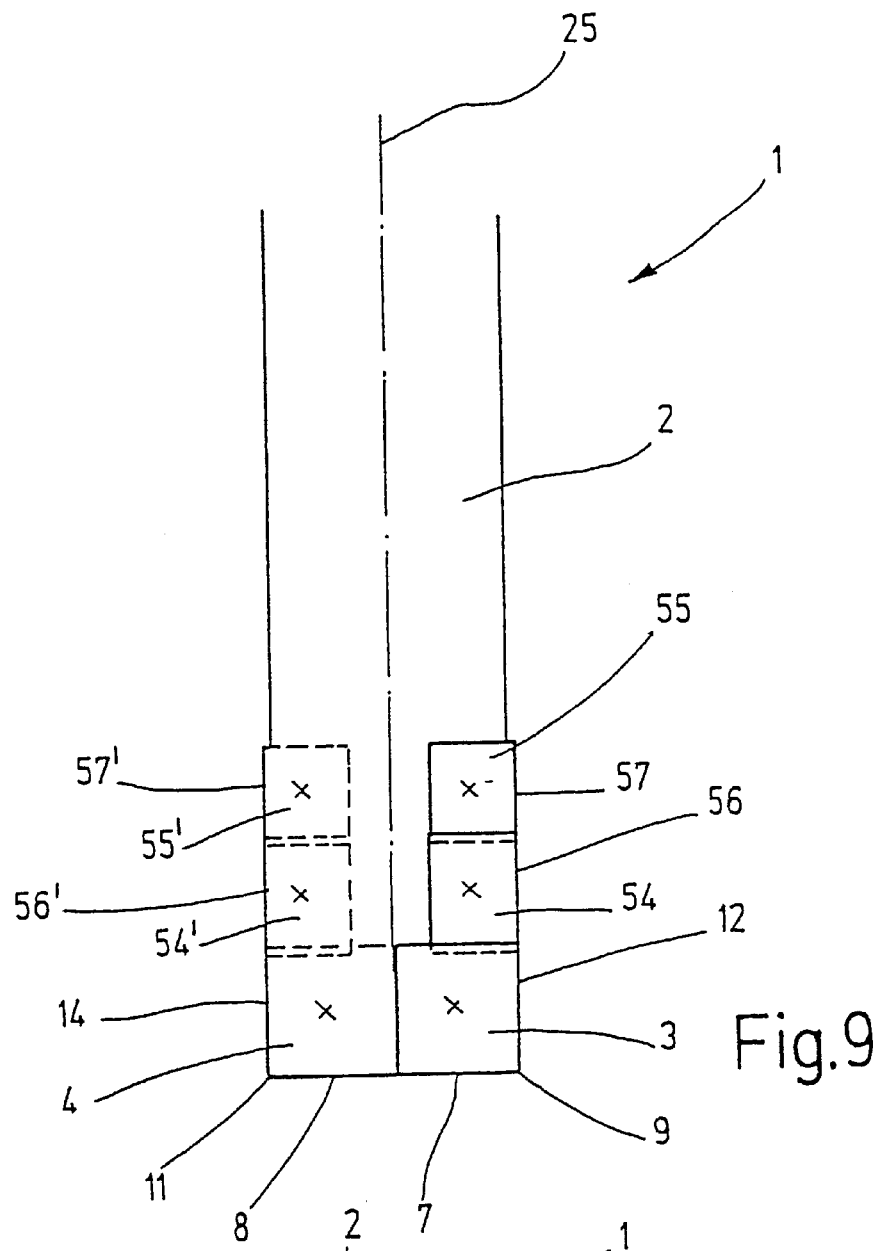
FIG. 9 is a partially schematic side view of the slot-drilling cutter shown in FIG. 8.
Figure 10:
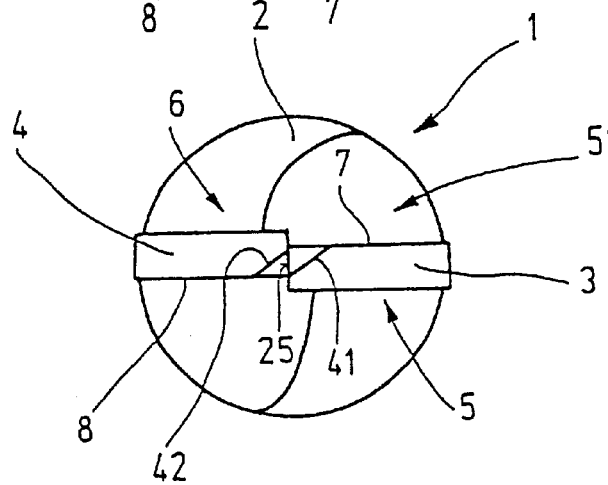
FIG. 10 is a partially schematic end view of the slot-drilling cutter shown in FIG. 9.

The cutting plates 54, 55 have peripheral cutting edges 56, 57, which overlap each other in respect to the direction of rotation. The peripheral cutting edge 12 furthermore overlaps the peripheral cutting edge 56, as schematically illustrated in FIG. 9. Further cutting plates adjoin the cutting plate 4, as well as the cutting plate 3, which are identified by 54' and 55' in FIG. 9. Therefore the slot-drilling cutter 1 in accordance with FIGS. 8 to 10 is truly two-edged. A first complete cutting edge extends, starting at the axis of rotation 25, first in the radial and then in the axial direction, wherein this cutting edge is constituted by the cutting edges 7, 9, 12, 56 and 57. A further complete cutting edge extends in the opposite direction, first in the radial direction and then in the axial direction, which is constituted by the cutting edges 8, 11, 14, 56' and 57'. To this end the plate seats 5, 52 and 53 extend behind each other, which can be seen in FIG. 8. For axial securement, the cutting plate 3 has a transverse step 61 at a suitable location, for example on its axially rear end, which has a flank 62 pointing in the axial direction toward the tool body end. A recessed step or cutout 63 in the cutting plate 3 mates with the transverse step 61.

A recess 64, which adjoins the plate seat 52, extends behind the transverse step 61. This permits positioning of the cutting plate 54 so that it extends into the recess 64, and therefore under the transverse step 61, and in this way, under the cutting plate 3. The cutting plate 54 is secured in the axial direction by a dowel screw 6 which extends through a fastening opening. No other contact faces are required for the axial direction.

In the radial direction, the cutting plate 54 rests against a lateral side contact face 66, which adjoins the plate seat 52. It provides the radial support during the milling operation, because the cutting plate 54 is only active during this milling. The plate seat, which also extends behind the plate seat 52, is similarly designed. This results in an arrangement of the cutting plates 3, 54, 55, as schematically depicted in FIG. 9.

FIG. 10 illustrates the design of the slot-drilling cutter 1 in the end area, and particularly the way the inner cutting edges 41, 42 at the end extend behind the axis of rotation 25 so that a complete cutting edge is formed which extends up to the axis of rotation. A small peg which is formed around the axis of rotation 25 during the drilling operation is laterally pushed away by the inclined surfaces of the cutting plates 3, 4 adjoining the inner cutting edges 41, 42, and therefore, does not interfere with the drilling operation. Moreover, the end of the metal cutting tool is designed to be symmetrical to the extent that no radial forces are generated. Two complete cutting edges (z=2) are provided in the embodiments represented and the corresponding cutting plates are arranged offset by approximately 180° in respect to each other. The cutting plate 3 is offset by approximately 180° in respect to the cutting plate 4. The same applies to the cutting plates 54, 54', as well as 55, 55'. If a larger number of teeth (z=3 or more) is required, a correspondingly larger number of cutting plates must be provided, i.e. three or more rows of cutting plates must be arranged on the tool body 2. If three cutting plates are to be arranged on the tool end, they are arranged at a distance of preferably 120° in respect to each other.

Figure 11:
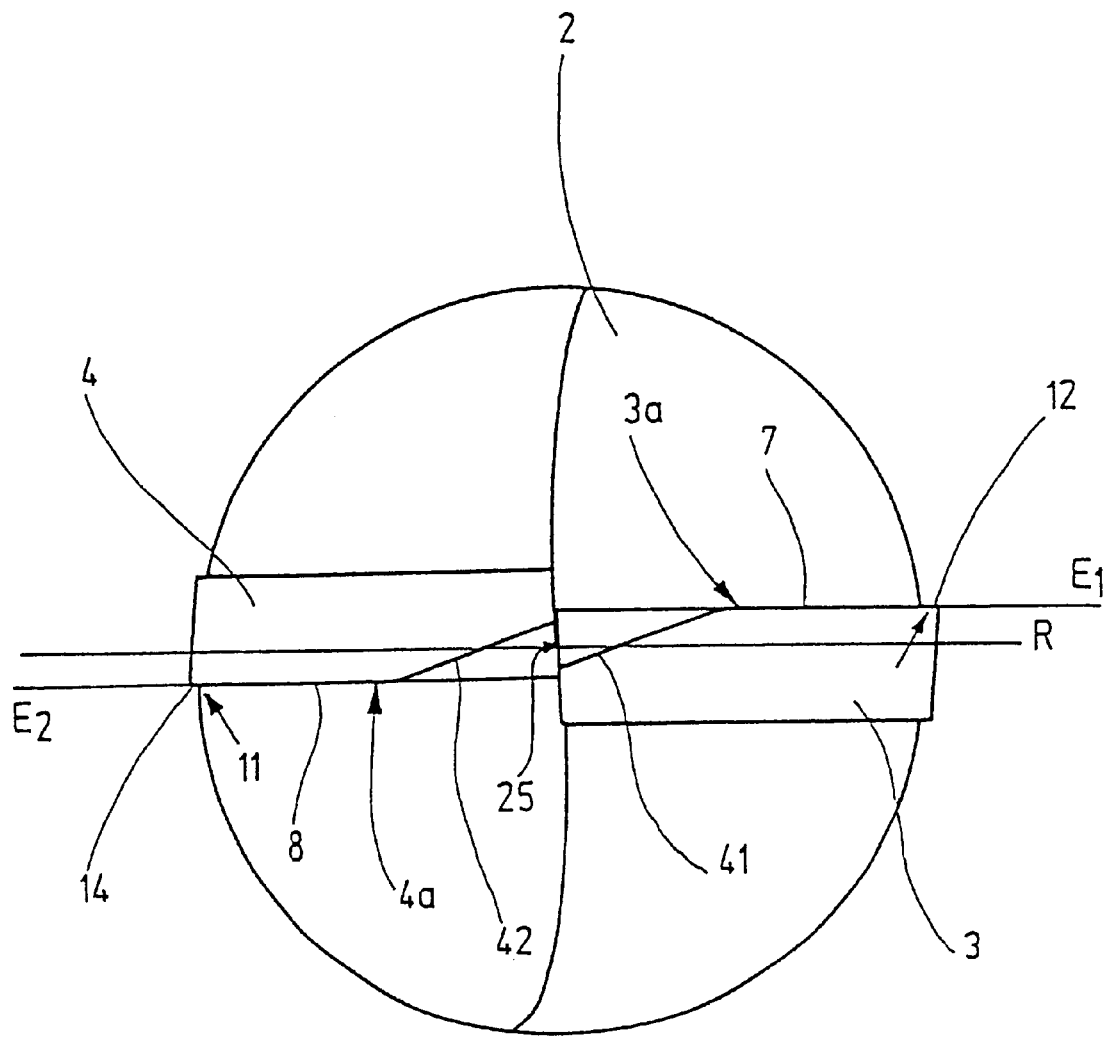
FIG. 11 is an enlarged end view of the slot-drilling cutter shown in FIG. 10.

It is common to all above described exemplary embodiments that the top surfaces 3a, 4a of the cutting plates 3, 4 are offset in respect to each other, as depicted in FIG. 11. The cutting plates 3, 4 are arranged with reference to a center plane or radial plane R, which contains the axis of rotation 25, in such a way that the top or end surfaces 3a, 4a are not located in this plane R, but in their own planes E1, E2. These planes E1, E2 can be aligned parallel with each other, in particular if the cutting plates 3, 4 have been installed without axial angles. However, they can also be arranged inclined toward the axis of rotation 25, so that they intersect the radial plane R in a common intersection line. With a section parallel with the drawing plane on which FIG. 11 is based, the intersecting lines of the drawing plane are parallel with the planes E1 and E2, but in this case also parallel with each other and parallel with the radial plane R. The result of this arrangement is that the top surfaces 3a, 4a are arranged so they lead in respect to the radial plane R and a direction of rotation, which is indicated by an arrow D in FIG. 11. A positive radial clearance angle is created on the peripheral cutting edges 12, 14 by this lead, without it being necessary to provide a larger clearance angle at the cutting plate 3, 4. Furthermore, the possibility of the lateral side faces of the cutting plates 3, 4 resting against each other, or resting against a strip 29 of the tool body formed between the cutting plates 3, 4 (see also FIGS. 1, 4, 5 and 7), is also created. This results in a considerably improved lateral support of the cutting plates 3, 4, which is particularly important in milling operations. In order to achieve a satisfactory chip formation and metal cutting effect also in the center area, i.e. in the vicinity of the axis of rotation 25, with such a leading arrangement of the cutting plates, the end cutting edges 7, 8 are led behind the axis of rotation 25, starting at the corner cutting edges. In the simplest case and as illustrated in FIG. 11, this can be achieved in that the end cutting edges 7, 8, which initially extend parallel with the radial plane R, make a transition into obliquely extending inner cutting edges 41, 42, which lead behind the axis of rotation 25. It is alternatively possible to arrange the entire end cutting edge 7, 8 inclined in respect to the radial plane R in order to lead, starting at the corner cutting edges 9, 11, behind the axis of rotation 25. The first mentioned case is preferred because of the simpler geometry of the cutting plate and its sturdier embodiment. The axial installation angle of the cutting plates 3, 4 is preferably zero.

An improved slot-drilling cutter has a tool body 2 with plate seats 5, 6 at the end, which are arranged symmetrically in respect to each other. Cutting plates 3, 4 are arranged on these, whose cutting edges 7, 9, 12, as well as 8, 11, 14 (and possibly 41, 42) are set completely identically, i.e. which cover each other completely in the circumferential direction. Because of this, respectively two cutting edges are active for the drilling operation, as well as for the milling operation, which increases the metal cutting yield and allows the same advancement when drilling, as well as when milling. The slot-drilling cutter is free of lateral forces because of the symmetrical design, which permits a high degree of working precision in spite of large advancement moves.

What is claimed is:

1. A slot-drilling cutter (1) comprising:
   a tool body (2) having at least one first plate seat (5) and at least one second plate seat (6), said plate seats being substantially similar to each other and arranged symmetrically in respect to an axis of rotation (25) of the tool body (2),
   a first cutting plate (3) and second cutting plate (4), said cutting plates (3, 4) being substantially identical with each other, each having a base, lateral side faces, and a top surface (3a, 4a), which define a substantially straight end cutting edge (7, 8), a corner cutting edge (9, 11), and a substantially straight peripheral cutting edge (12, 14),
   said end cutting edges (7, 8), the corner cutting edges (9, 11) and peripheral cutting edges (12, 14) being similarly positioned in an axial direction (a) and radial direction (r),
   said top surfaces (3a, 4a) of the cutting plates (3, 4) being offset with respect to each other,
   said peripheral cutting edges (12, 14) of the cutting plates (3, 4) being arranged on a cylindrical surface (Z) which is concentric with the axis of rotation (25) and being effective for removing material at a bottom of a slot being drilled by the slot drilling cutter as an incident to lateral movement of the cutter in a direction perpendicular to the axis of rotation (25),
   said end cutting edges (7, 8) being arranged on a conical surface (K) recessed axially inwardly into an end of the cutter and being effective for removing material from an end of the slot being drilled by said slot drilling cutter as an incident to movement of the cutter in a direction along the axis of rotation (25).

2. The slot-drilling cutter of claim 1 in which the end cutting edges (7, 8), the corner cutting edges (9, 11) and the peripheral cutting edges (12, 14) of the two cutting plates (3, 4) are respectively of the same length.

3. The slot-drilling cutter of claim 1 in which the end cutting edges (7, 8), the corner cutting edges (9, 11) and the peripheral cutting edges (12, 14) of the two cutting plates (3, 4) respectively have the same shape.

4. The slot-drilling cutter of claim 1 in which the end cutting edges (7, 8) of the two cutting plates (3, 4) extend at least as far as a center area of rotation surrounding the axis of rotation (25), which is fixed by an inner cutting edge (41, 42) of the cutting plates.

5. The slot-drilling cutter of claim 1 in which the end cutting edges (7, 8) of the two cutting plates (3, 4) extend at least as far as a center area of rotation surrounding the axis of rotation (25) which is fixed by an inner cutting edge (23) that joins at least one of the cutting plates (3, 4) without a gap.

6. The slot-drilling cutter of claim 1 in which the cutting plates are operable for metal cutting during movement of the cutting tool in a direction (a) of the axis of rotation (25) as well as advancement in a direction (r) transversely thereto.

7. The slot-drilling cutter of claim 1 in which the end cutting edges (7, 8) are arranged on a cone surface (K) whose cone angle is greater than 170°.

8. The slot-drilling cutter of 1 in which the plate seats (3, 4) have contact faces (46, 47) which extend at a short distance along the axis of rotation (25) so that the cutting plates (3, 4) can radially rest against them.

9. The slot-drilling cutter of claim 8 in which the contact faces (46, 47) are arranged at an acute angle in respect to the axis of rotation (25) so that the tool body (2) has a strip in the area of the axis of rotation (25) which is arranged symmetrically with the latter.

10. The slot-drilling cutter of claim 1 in which said plate seats (5, 6) for the cutting plates (3, 4) are designed without radial contact faces so that the cutting plates (3, 4) directly adjoin each other.

11. The slot-drilling cutter of claim 1 in which said plate seats (5, 6) for the cutting plates (3, 4) have at least one longitudinal step (35, 36 FIG. 5) for radial support of the cutting plates (3, 4).

12. The slot-drilling cutter of claim 1 in which said cutting plates (3, 4) are respectively held by means of a dowel screw (17) against a contact surface (46, 47; 22) of the plate seat (5, 6), so as to affix the cutting plate (3, 4) against displacement in one direction.

13. The slot-drilling cutter of claim 1 in which said plate seats (5, 6) for the cutting plates (3, 4) have resting surfaces (21) through which a threaded fastener opening passes.

14. The slot-drilling cutter of claim 1 in which adjoining the plate seats (5, 6) for the cutting plates (3, 4), the tool body (2) has further plate seats (52, 53) for peripheral cutting plates (54, 55, 54', 55') which have peripheral cutting edges (56, 57, 56', 57') that extend beyond each other in an axial direction, and hence, overlap during cutting as an incident to rotation of the tool body.

15. The slot-drilling cutter of claim 6 in which the cutter can be advanced at equal speeds in the direction (a) of the axis of rotation (25) as in the direction (r) transversely to the axis of rotation (25).

16. The slot-drilling cutter of claim 14 in which said plate seats (5, 6) of the cutting plates (3, 4) have a transverse step (61) for the axial support of the cutting plate (3, 4).

17. The slot-drilling cutter of claim 1 in which said cutting plates (3, 4) are reversible cutting plates.

* * * * *